Oct. 27, 1936.  G. L. KOLLBERG  2,058,996
BUTTERFLY VALVE
Filed June 28, 1933

Inventor
G. L. Kollberg

Patented Oct. 27, 1936

2,058,996

UNITED STATES PATENT OFFICE 2,058,996

BUTTERFLY VALVE

Gustaf L. Kollberg, Milwaukee, Wis., assignor to Allis-Chalmers Manufacturing Company, Milwaukee, Wis., a corporation of Delaware Application June 28, 1933, Serial No. 678,044

5 Claims. (Cl. 251—11)

This invention relates generally to butterfly valves for controlling the flow of fluid in conduits and particularly to a butterfly valve of the type in which the valve disk is mounted at an acute angle to the operating shaft.

The subject matter of the present invention is related to and constitutes an improvement upon the invention covered by Patent 1,671,069, issued May 22, 1928 to George F. DeWein, and assigned to Allis-Chalmers Manufacturing Company.

The general object of the invention is to provide in a conduit a butterfly valve that is efficiently packed to prevent flow of fluid through the conduit when the valve is closed.

A more specific object of the invention is to provide a butterfly valve of the type having a continuous packing ring, that may be manufactured readily and economically, that is simple to assemble, and that is of rugged and enduring construction.

Another object of the invention is to provide a butterfly valve comprising a one piece casing provided with a cylindrical valve seating bore arranged with its axis at an acute angle with the axis of the casing, a valve shaft being mounted in said casing perpendicularly to the axis of the casing, and a valve disk being mounted on the shaft in position to be turned into concentric relation with said valve seating bore.

According to the present invention, a butterfly valve having its valve disk mounted at an acute angle to its operating shaft for receiving a continuous peripheral packing ring, is arranged within an annular casing forming part of a conduit with the axis of the shaft at right angles to the axis of the casing. To engage the valve disk the casing is provided with a valve seat comprising a complementary internal cylindrical bore disposed at right angles to the plane of the valve disk when the disk is turned into relation with the bore to close the conduit.

The foregoing and other objects of the invention may be achieved by the valve mechanism described as a specific embodiment of the invention in the following part of this specification in conjunction with the accompanying drawing, in which.

Figure 1:
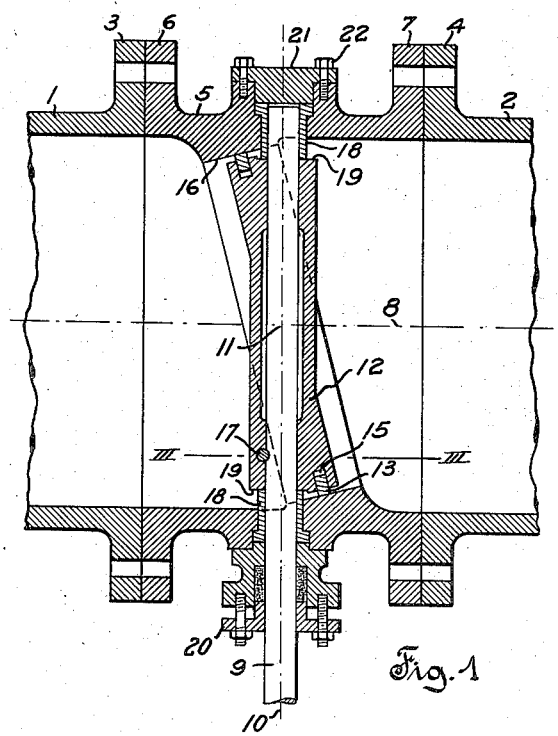
Fig. 1 is a view in longitudinal section of a conduit including a valve embodying the invention and showing the valve disk in closed position.

The illustrated portion of a conduit in which the flow of fluid is controlled by a valve embodying the invention, comprises a plurality of tubular pipes 1 and 2 arranged in axial alinement with their adjacent ends in spaced relation and provided with parallel transverse flanges 3 and 4, respectively. Between the spaced flanges 3 and 4 of the pipe is arranged a one piece annular valve casing 5 having similar parallel end flanges 6 and 7 cooperating respectively with, and attached to the flanges of the pipes. As shown, the annular casing 5 constitutes a substantially cylindrical continuation of the conduit and is arranged with its axis 8 in alinement with the axes of the pipe sections.

The valve is provided with a transversely arranged operating shaft 9 disposed substantially in the mid-plane of the casing 5 with its axis 10 intersecting the axis 8 of the conduit at right angles in a focus 11. A valve disk 12 is carried by the shaft 9 within the casing 5 and is arranged to be rotated to open or close the conduit.

As may be seen in the drawing, the valve disk 12 is arranged on the shaft 9 in such manner that the axis 10 of the shaft intersects the mid-plane of the disk at its center at an acute angle, the point of intersection being coincident with the focus 11. With the valve disk arranged on the shaft in this manner, the shaft passes through the disk without interrupting the periphery of the disk thereby making it possible to provide the disk with a continuous packing ring 13 upon its periphery in accordance with the invention covered by the hereinbefore mentioned patent.

Figure 2:
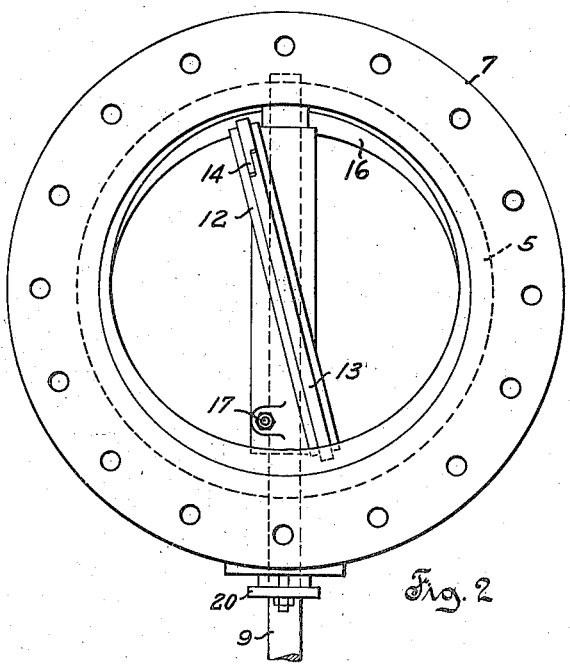
Fig. 2 is a view in end elevation showing the valve disk in open position.

The ring 13 is preferably formed of flexible material of rectangular cross-section presenting a substantially cylindrical peripheral seating surface. As shown in Fig. 2, the ring is cut through at one point to permit expansion and contraction and its ends are shaped to constitute a step joint 14 similar to the joint of a piston ring. The ring 13 is retained in position on the periphery of the disk 12 by a groove 15 into which it is placed by dilating the ring sufficiently to pass it over the periphery of the disk and then permitting it to contract into the groove.

For cooperating with the peripheral seating surface of the packing ring 13 to close the valve the casing 5 is provided with a complementary internal cylindrical valve seating bore 16 arranged at right angles to the plane of the valve disk when the disk is in closed position, the casing being of sufficient internal diameter to admit the valve disk in assembling the valve. In the closed position the disk 12 is disposed in concentric relation with the seating bore 16; consequently, the axis of the seating bore 16 intersects the axis 8 of the conduit in the focus 11 at an acute angle equal to the angle between the axis of the shaft 9 and the plane of the valve disk 13, the bore axis lying in the longitudinal plane of the casing defined by the conduit axis 8 and the shaft axis 10.

Figure 3:
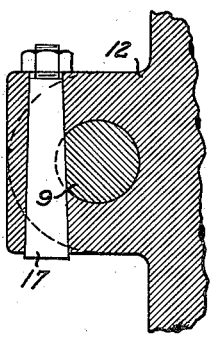
Fig. 3 is a fragmentary sectional view taken on the plane represented by the line III—III in Fig. 1, showing the means for connecting the valve disk to the operating shaft.

As shown in Fig. 3, the valve disk 12 is secured to the shaft 9 to rotate with it by a tapered dowel pin 17. The shaft is rotatably supported in the opposite sides of the casing 5 by journal bearings or bushings 18, from one of which a part of the shaft extends to provide means for rotating the valve. The inner ends of the bushings 18 engage plane faces 19 at the edges of the valve disk 12 and constitute thrust bearings for retaining the valve disk in position transversely of the casing. A packing gland 20 is provided to prevent leakage of fluid along the extending part of the shaft 9 and the other end of the shaft is enclosed by a cover plate 21 attached to the casing 5 by cap screws 22.

The particular embodiment of the invention described herein by way of example is susceptible of various modifications in the details of its construction without departing from the spirit and scope of the invention as defined in the subjoined claims.

It is claimed and desired to secure by Letters Patent:

1. A butterfly valve comprising an annular casing having a cylindrical internal valve seating bore disposed with its axis at an acute angle with the axis of the casing, a shaft disposed through said casing at right angles to the axis of the casing, and a valve disk mounted on said shaft in position to be turned into concentric relation with said valve seating bore when said valve is closed, whereby a continuous packing ring may be applied to the peripheral surface of said disk.

2. A butterfly valve for controlling the flow of fluid through a conduit, comprising an annular valve casing presenting a cylindrical opening constituting a portion of a fluid conduit and having formed on its inner surface a cylindrical valve seating bore disposed with its axis at an acute angle to the axis of the casing, a valve shaft journaled transversely of said casing with its axis at right angles to the axis of said casing, a valve disk of diameter permitting ready insertion and removal through the cylindrical opening of said valve casing whereby a one-piece casing may be utilized, said disk being carried by said valve shaft at such angle thereto as to present a continuous peripheral surface and as to be in position to be turned into concentric cooperating relation with said angularly disposed seating bore to close the conduit, and a continuous circular packing ring encircling said disk at its periphery for engaging said seating bore when said disk is in closed position.

3. A butterfly valve comprising a valve disk having a continuous circular periphery, a valve shaft extending through said valve disk at an acute angle to the plane thereof and spaced from said continuous periphery, a flexible circular packing ring encircling said valve disk at its periphery, and an annular valve casing disposed to enclose said valve disk and arranged to journal said valve shaft with its axis at right angles to the casing axis, said casing presenting a cylindrical opening of diameter permitting ready insertion and removal of said valve disk whereby a one-piece casing may be utilized and having formed at its inner surface a cylindrical valve seating bore of diameter to cooperate with said packing ring on said valve disk and disposed at such angle as to receive said disk in concentric relation when said valve is in closed position.

4. A butterfly valve comprising a valve disk presenting a continuous circular peripheral surface, a valve shaft passing through said valve disk at an acute angle to the plane thereof and spaced from said continuous peripheral surface, a one-piece annular valve casing of such internal diameter as to readily receive said valve disk and provided with journals supporting said valve shaft at right angles to the casing axis and having projecting inwardly from its inner surface two crescent shaped portions constituting a cylindrical valve seating bore positioned with its axis at such angle to the axis of the casing as to coincide with the axis of said disk when it is turned into transverse position to close the valve, and a continuous circular sealing ring encircling said valve disk at its periphery and adapted to engage said seating bore when the valve disk is in closed position.

5. In a butterfly valve of the type wherein a valve disk is mounted on a valve shaft at such angle thereto as to provide a continuous circular peripheral surface, a one-piece annular valve casing having an internal cylindrical valve seating bore disposed with its axis at an angle to the axis of said casing, a valve shaft disposed through said casing at right angles to the axis thereof, and a valve disk having a continuous peripheral seating surface carried by said valve shaft in such position that it may be turned thereby to bring said peripheral seating surface into continuous coacting relation with said cylindrical valve seating bore.

GUSTAF L. KOLLBERG.